United States Patent
Iwatake

(10) Patent No.: US 9,662,790 B2
(45) Date of Patent: May 30, 2017

(54) ROBOT CONTROLLER AND ROBOT SYSTEM FOR MOVING ROBOT IN RESPONSE TO FORCE

(71) Applicant: FANUC CORPORATION, Yamanashi (JP)

(72) Inventor: Takahiro Iwatake, Yamanishi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 14/684,806

(22) Filed: Apr. 13, 2015

(65) Prior Publication Data

US 2015/0290799 A1    Oct. 15, 2015

(30) Foreign Application Priority Data

Apr. 14, 2014    (JP) ................................. 2014-082620

(51) Int. Cl.
*B25J 9/16*    (2006.01)
*G01L 5/00*    (2006.01)

(52) U.S. Cl.
CPC ............. *B25J 9/161* (2013.01); *B25J 9/1694* (2013.01); *G01L 5/0028* (2013.01); *G01L 5/0038* (2013.01); *G05B 2219/39439* (2013.01)

(58) Field of Classification Search
CPC ........ B25J 9/0081; B25J 9/161; B25J 13/065; B25J 9/1694; B25J 9/1651; B25J 9/1612;
(Continued)

(56) References Cited

U.S. PATENT DOCUMENTS

| 4,408,286 A | 10/1983 | Kikuchi et al. |
| 5,587,937 A * | 12/1996 | Massie .................. B25J 9/1689 700/264 |

(Continued)

FOREIGN PATENT DOCUMENTS

| CN | 1824471 A | 8/2006 |
| CN | 102672717 A | 9/2012 |

(Continued)

OTHER PUBLICATIONS

Morinaga, S., Kosuge, K., "Compliant Motion Control of Manipulator's Redundant DOF Based on Model-based Collision Detection System", Proceedings of the 2004 IEEE, International Conference on Robotics and Automation, Apr. 2004, pp. 5212-5217.

*Primary Examiner* — Bao Long T Nguyen
(74) *Attorney, Agent, or Firm* — Hauptman Ham, LLP

(57) ABSTRACT

A robot controller and a robot system capable of stably changing the orientation of a front end of a robot by applying a force to the front end, and moving each axis to a desired position. The robot controller for moving the robot based on the force applied to the robot includes a control point specifying part which specifies a control point in relation to the robot, and an operation commanding part which outputs a command so that the robot performs rotational movement about the control point. The robot has a structure constituted by sequentially combining three or more axes including at least three rotation axes, and rotation centerlines of the three rotation axes intersect at an origin of a centerline-intersecting axis, the centerline-intersecting axis corresponding to one of the three rotation axes. The control point specifying part specifies the origin of the centerline-intersecting axis as the control point.

3 Claims, 2 Drawing Sheets

(58) Field of Classification Search
CPC ...... B25J 9/1628; B25J 9/1633; B25J 9/1953;
B25J 13/02; B25J 13/08–13/081; B25J
13/084–13/085; B25J 9/02; B25J 9/04;
G06F 17/16; G01L 5/0028; G01L 5/22;
G05B 2219/35438; G05B 2219/39439;
G05B 19/37357; G05B 19/416; G05B
19/423; G05B 2219/40408; Y10S
901/02–901/04; Y10S 901/46
USPC ..... 700/258, 250, 253, 257; 901/2, 3, 4, 46;
318/568.13, 568.14, 568.16, 568.17,
318/568.18
See application file for complete search history.

(56) References Cited

U.S. PATENT DOCUMENTS

| | | | | |
|---|---|---|---|---|
| 5,784,542 | A * | 7/1998 | Ohm | B25J 3/04 700/247 |
| 8,423,182 | B2 * | 4/2013 | Robinson | A61B 18/1206 700/245 |
| 2006/0195228 | A1 | 8/2006 | Igarashi | |
| 2008/0140257 | A1 | 6/2008 | Sato et al. | |
| 2009/0171505 | A1 * | 7/2009 | Okazaki | B25J 9/1676 700/258 |
| 2010/0111645 | A1 * | 5/2010 | Al-Mouhamed | B25J 13/02 414/5 |
| 2010/0300230 | A1 * | 12/2010 | Helmer | B25J 9/106 74/469 |
| 2011/0087374 | A1 * | 4/2011 | Ando | B25J 9/1633 700/260 |
| 2011/0257787 | A1 | 10/2011 | Sato et al. | |
| 2012/0239192 | A1 | 9/2012 | Yamato et al. | |
| 2013/0268120 | A1 | 10/2013 | Grygorowicz et al. | |
| 2013/0304258 | A1 * | 11/2013 | Taylor | A61B 19/2203 700/260 |

FOREIGN PATENT DOCUMENTS

| | | |
|---|---|---|
| JP | 56-85106 A | 7/1981 |
| JP | 06-250728 A | 9/1994 |
| JP | 9-38877 A | 2/1997 |
| JP | 2008-142810 A | 6/2008 |
| JP | 2008-173711 A | 7/2008 |
| JP | 2011-206886 A | 10/2011 |
| JP | 2012-157946 A | 8/2012 |

* cited by examiner

ROBOT CONTROLLER AND ROBOT SYSTEM FOR MOVING ROBOT IN RESPONSE TO FORCE

RELATED APPLICATIONS

The present application claims priority to Japanese Application Number 2014-082620, filed Apr. 14, 2014, the disclosure of which is hereby incorporated by reference herein in its entirety.

BACKGROUND OF THE INVENTION

1. Field of the Invention

The preset invention relates to a robot controller for moving a robot based on a force applied to the robot, and relates to a robot system including the robot and the robot controller.

2. Description of the Related Art

As an operation method for moving a robot by applying a force to the robot, or a method for moving a robot by applying a force to the robot so as to teach a position, direct teaching is well known. In direct teaching, by directly guiding the robot by applying a force to the robot in a desired moving direction, the robot can be moved to a desired position and/or orientation on an orthogonal coordinate system.

As relevant prior art documents, JP S56-085106 A discloses a method for moving the position and orientation of a front end of a robot arm, based on a signal generated by a force detector when a manual operation part attached to the front end of the robot arm is operated.

Further, JP H06-250728 A discloses a direct teaching device for a robot, wherein a force sensor arranged on the robot detects a force by a human applied to an end effector, and a robot arm is guided only in a direction determined by an operation direction setting means, when the motion of the robot arm is to be controlled based on a force signal obtained by the force sensor.

In the method of JP S56-085106 A, the position and/or orientation of the front end of the robot on the orthogonal coordinate system are moved in response to the force. In this regard, depending on a setting of responsiveness of the force control or a way of movement, the motion for changing the orientation may be unstable. Further, JP S56-085106 A does not describe a method or means for moving the position of each axis during the direct teaching.

On the other hand, it could be understood that the device of JP H06-250728 A is configured to limit the direction of movement of the robot in relation to a direction regarding the position or orientation of the front end of the robot on a Cartesian coordinate system, when the robot is moved by the direct teaching, and move the robot only in the limited direction so as to improve operability of the robot. However, JP H06-250728 A does not describe a method for stably changing the orientation of the robot or stably moving the position of each axis.

SUMMARY OF THE INVENTION

Therefore, an object of the present invention is to provide: a robot controller capable of stably changing the orientation of a front end of a robot by applying a force to the front end, and moving each axis to a desired position by changing the orientation of the front end of the robot on an orthogonal coordinate system; and a robot system including the robot controller and the robot.

According to one aspect of the present invention, there is provided a robot controller for moving a robot based on a force applied to the robot, the robot controller comprising: a force measuring part which measures a force applied to a front end of the robot; a control point specifying part which specifies a control point in relation to the robot; a force calculating part which calculates a force on a control coordinate system at the control point, based on the force measured by the force measuring part; and an operation commanding part which outputs a command to the robot based on the force on the control coordinate system calculated by the force calculating part so that the robot performs rotational movement about the control point, wherein the robot has a structure constituted by sequentially combining three or more axes including at least three rotation axes, and rotation centerlines of the three rotation axes intersect at an origin of a centerline-intersecting axis, the centerline-intersecting axis corresponding to one of the three rotation axes, and wherein the control point specifying part specifies the origin of the centerline-intersecting axis as the control point.

In a preferred embodiment, the robot includes a pedestal and at least one axis positioned between the pedestal and the rotation axis closest to the pedestal among the three rotation axes, and wherein the robot is a vertical multi-joint robot in which a spatial position of the origin of the centerline-intersecting axis is determined based on a position of the at least one axis.

In a preferred embodiment, the operation commanding part outputs a command to the robot based on the force on the control coordinate system calculated by the force calculating part so that the robot performs rotational movement about the control point and translational movement.

According to another aspect of the present invention, a robot system comprising the robot and the robot controller is provided.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
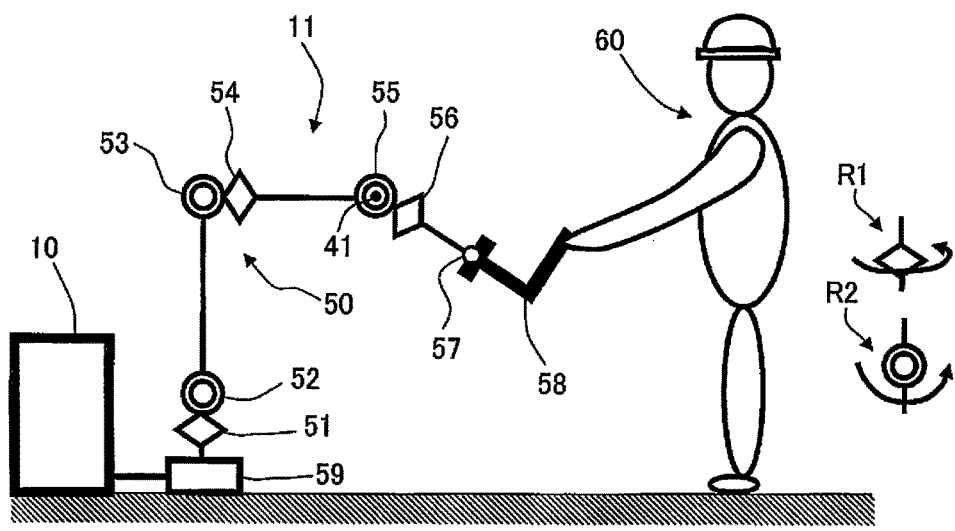
FIG. 1 shows a schematic configuration of a robot system including a robot controlled by a robot controller according to an embodiment of the present invention.

Hereinafter, an embodiment of the present invention will be explained with reference to the accompanying drawings. In order to facilitate understanding of the invention, a scale in the drawings is properly varied.

Herein, the term "force" includes a translational component and a moment component of the force, if not otherwise specified, and the term "position and/or orientation" includes at least one of the position and orientation. Further, the term "axis" means a joint portion for connecting links that constitute a robot, by which the positional and angular relationships between the links may be changed. For example, by changing the position of the axis (or the angle when the axis is a rotation axis), the positional relationship between the links can be changed, whereby the position and/or orientation of a front end of the robot can be changed. In this regard, an actuator for moving the position the axis may be arranged on a portion other than the axis. Further, the term "force control gain" means a coefficient for determining an amount of movement, in force control for moving the robot in response to a force applied to the robot, based on the magnitude of the applied force. For example, the amount of movement may include the position and/or orientation of a front end of the robot on an orthogonal coordinate system at each control period, or the position of each axis of the robot at each control period.

FIG. 1 is a schematic view showing an example of configuration of a robot system 11 including a robot controller 10 according to an embodiment of the present invention and a robot 50 controlled by robot controller 10. Robot controller 10 is configured to control the position of each axis of robot 50 at each of predetermined control periods.

In robot system 11, when an operator 60 applies a force (external force) to a front end 58 of robot 50, robot controller 10 controls an actuator for moving each axis of robot 50 based on the force applied to front end 58 of robot 50 measured by a force measuring part 21 (FIG. 2), data which has been set, and position data of robot 50, etc., whereby the position of axis constituting robot 50 is changed and robot 50 is moved. Further, robot controller 10 has hardware including an arithmetic processing unit, a ROM and a RAM, etc., and executes various functions as explained below.

Robot 50 controlled by robot controller 10 according to the embodiment of the invention is a vertical multi-joint robot having a structure constituted by sequentially combining three or more axes including at least three rotation axes. Further, without depending on the position of the axes, rotation centerlines of the three rotation axes intersect at an origin of a centerline-intersecting axis corresponding to one of the three rotation axes, and a spatial position of the origin of the centerline-intersecting axis is determined based on a position of at least one axis of the three or more axes between a pedestal of the robot and the rotation axis closest to the pedestal among the three rotation axes.

Hereinafter, the structure of robot 50 is concretely explained with reference to FIG. 1. Although robot 50 is a vertical multi-joint robot having six axes in the embodiment of FIG. 1, the present invention can also be applied to any conventional robot having the above structure. Further, although all of the six axes in FIG. 1 are rotation axes, the axes may include a linear axis.

Robot 50 has six axes, i.e., J1 axis 51, J2 axis 52, J3 axis 53, J4 axis 54, J5 axis 55 and J6 axis 56, in order of increasing a distance from pedestal 59 of robot 50. Each of J1 axis 51, J4 axis 54 and J6 axis 56 has a rotation axis R1 which rotates about a link connecting the axes (i.e., R1 is parallel to the drawing), and each of J2 axis 52, J3 axis 53 and J5 axis 55 has a rotation axis R2 which rotates about a direction perpendicular to the link connecting the axes (i.e., R2 is perpendicular to the drawing). In this regard, FIG. 1 is a simplified explanatory view for representing the structure of the axes of robot 50.

When an origin of each axis is defined as an origin of a coordinate system associated with the corresponding axis where the links are connected to each other, the position of the origin of each axis is represented as a position on a coordinate system specified in a space (hereinafter, also referred to as a reference coordinate system). In the structure of FIG. 1, the origins of J1 axis 51 and J2 axis 52 are at the same position, the origins of J3 axis 53 and J4 axis 54 are at the same position, and the origins of J5 axis 55 and J6 axis 56 are at the same position.

In the embodiment of FIG. 1, regarding continuous three rotation axes, i.e., J4 axis 54, J5 axis 55 and J6 axis 56, among the plurality of (six in the embodiment) axes constituting robot 50, three rotation centerlines of J4 axis 54, J5 axis 55 and J6 axis 56 intersect at origin 41 of J5 axis 55. In other words, the origin of J5 axis 55 corresponds to an intersection point of the three rotation centerlines of the three rotation axes, and J5 axis 55 may be referred to as a enter line-intersecting axis. In this case, when each of the axes constituting robot 50 is moved to any positions, origin 41 corresponds to the intersection point of the rotation centerlines of the three rotation axes (J4 axis 54, J5 axis 55 and J6 axis 56). Therefore, in robot 50, without depending on the position of each of the axes constituting robot 50, the rotation centerlines of the three rotation axes among the axes constituting robot 50 intersect at the origin of one of the three rotation axes.

In robot 50, the spatial position of the origin of the centerline-intersecting axis is determined based on the positions of the J1 axis 51, J2 axis 52 and J3 axis 53, which are positioned between pedestal 59 of robot 50 and the axis (in this case, J4 axis 54) closest to pedestal 59 among the three rotation axes (J4 axis 54, J5 axis 55 and J6 axis 56).

In the embodiment, regarding the expression "the position of the rotation axis is moved," the position of the axis means the rotation angle thereof and "is moved" means "is rotated." The "position of the origin of the axis" means the position of the origin of the coordinate system associates with each axis on the reference coordinate system specified in the space. The reference coordinate system means an orthogonal coordinate system fixed in a space, and is used to represent the position and/or orientation of front end 58 or a flange portion 57 (to which front end 58 is attached) of robot 50, or the position and/or orientation of a coordinate system associated with each axis, etc.

A tool coordinate system is specified in relation to robot 50 in order to represent the position and/or orientation of robot 50 on the reference coordinate system associated with the space. The origin of the tool coordinate system, corresponding to a point to be translated or a center point about which rotational movement is performed, is defined as a control point. Further, a coordinate system associated with the control point and parallel to the reference coordinate system is defined as a control coordinate system. In addition, the position of the control point may be arbitrarily determined as long as the control point is associated with robot 50.

Front end 58 of robot 50 is an article which is attached to a front side (or flange portion 57 of robot 50) of the axis farthest from pedestal 59 of robot 50 (in this case, J6 axis 56). A six-axis force sensor (not shown) is attached to front end 58 of robot 50. In robot controller 10, force measuring part 21 measures a force applied to front end 58 of robot 50 by the operator, based on outputs of the force sensor detected at specified time intervals.

Force measuring part 21 specifies a coordinate system having the origin positioned at a force measurement point on front end 58 of robot 50, and measures a translational component F and a moment component M of the force applied to front end 58 of robot 50 on the specified coordinate system. Hereinafter, this coordinate system is referred to as a force measurement coordinate system, and the origin of the force measurement coordinate system is referred to as a force measurement point. In this regard, the translational components of the force of X-, Y- and Z-axes on the coordinate system specified at front end 58 of robot 50 are represented by Fx, Fy and Fz, respectively, and the moment components of the force about the X-, Y- and Z-axes on the coordinate system are represented by Mx, My and Mz, respectively.

The force measurement point may be specified at an application point to which the operator applies the force, the origin of the sensor coordinate system associated with the force sensor, or a point on the axis of the sensor coordinate system, etc. Although the six components of the force are measured in the embodiment, only the translational component(s) F or only the moment component(s) M of the force may be measured. Further, the force sensor may be attached to any portion as long as the sensor can measure the force applied to front end 58 of robot 50.

Instead of the six-axis force sensor, three-axis force sensor may be used, for example, as a means to measure the force applied to front end 58 of robot 50. Otherwise, instead of using the force sensor, the force applied to front end 58 of robot 50 may be estimated, by using a current value of the actuator for moving the axis constituting robot 50 may be used when the actuator is a motor, or a deviation between a command position and an actual position of the axis, or an output of a torque sensor attached to each axis, etc.

To front end 58 of robot 50, a tool for processing or conveying a workpiece or a maneuvering unit for operating or moving the robot in response to the force may be attached. For example, the maneuvering unit may be configured as a handle or a control bar capable of being gripped by operator 60, and may have a button, etc., for teaching the robot. When the force sensor is attached to front end 58 of robot 50, the tool or the maneuvering unit may be attached to the force sensor attached to robot 50. Otherwise, the force sensor may be attached to the tool attached to robot 50, and the maneuvering unit may be attached to the front side of the force sensor. When the force is to be applied to front end 58 of robot 50, the force may be applied to the tool attached to the force sensor without using the maneuvering unit, otherwise, the force may be applied to the maneuvering unit attached to the force sensor.

When the operator applies the force to the tool or the maneuvering unit attached to the force sensor so as to move robot 50, force measuring part 21 measures a net force applied to front end 58 of robot 50 by the operator, based on the force detected by the force sensor. In this regard, when an assembly of the force sensor and the maneuvering unit is attached to the tool attached to front end 58 of robot 50, the force sensor is less affected by a gravity force or an inertia force of a portion attached to the force sensor, whereby an error in calculating or determining the net force may be smaller.

In order that the assembly of the force sensor and the maneuvering unit is easily detached from the tool, the assembly may be attached to the tool by using a mechanism constituted by a magnet or a spring, etc. By virtue of this, the assembly for detecting the force may be attached to the robot only when robot 50 is to be moved or operated in response to the force. Therefore, the assembly may be detached when teaching operation is not necessary, or the assembly may be used in another robot system as needed.

Figure 2:
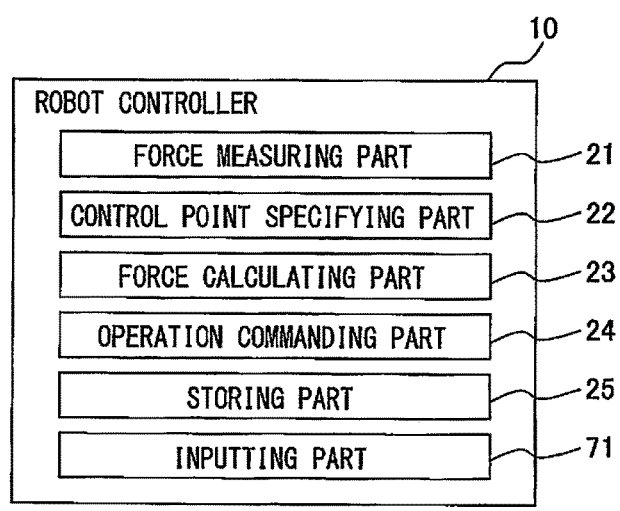
FIG. 2 is a functional block diagram showing a configuration of the robot controller according to the embodiment of the present invention.

FIG. 2 is a functional diagram of an example of the configuration of robot controller 10 according to the embodiment of the present invention. As shown, robot controller 10 has a force measuring part 21, a control point specifying part 22, a force calculating part 23, an operation commanding part 24, a storing part 25 and an inputting part 71.

Force measuring part 21 measures a net force applied to front end 58 of robot 50 by the operator. In this regard, force measuring part 21 compensates the affect on the force detected by the force sensor due to the gravity or inertia force (including the Coriolis force and gyro effect) of an article such as the tool and the maneuvering unit attached to the force sensor or the gripped workpiece, so as to determine the net force applied to front end 58 of robot 50 by the operator. The affect of the gravity or the inertia force by the article attached to the force sensor may be compensated by a conventional method. For example, the mass and the gravity center of the article attached to the force sensor may be previously calculated before the operator applies the force to the robot, and the force may be corrected by using a method as disclosed in JP 2008-142810 A, with reference to the calculated mass and gravity center of the article and the motion of the robot.

Control point specifying part 22 specifies a control point in relation to robot 50. When the outer force is applied to front end 58 of robot 50, robot controller 10 translates the specified control point, or rotates the robot about the control point, based on the outer force. The control point may be specified based on settings stored in robot controller 10, or may be specified by using an eternal input device, etc., connected to robot controller 10. The specified control point may be changed during movement operation of robot 50. Further, robot controller 10 may change the position of the control point based on the position of the axis of robot 50 or the force measured by force measuring part 21, depending on a status of the movement operation of robot 50.

Control point specifying part 22 specifies the origin of the centerline-intersecting axis (in the illustrated example, origin 41 of J5 axis 55) as the control point. In this regard, control point specifying part 22 may switch the control point from a predetermined position (point) to the origin of the centerline-intersecting axis. Further, control point specifying part 22 may switch the control point from the origin of the centerline-intersecting axis to another point. As such, by switching the control point, robot 50 may be moved as needed, as in the embodiment.

Force calculating part 23 calculates an operation force for moving the position and/or orientation of front end 58 of robot 50 on the orthogonal coordinate system, based on the force including the translational component and/or the moment component of the force applied to front end 58 of robot 50. Concretely, force calculating part 23 calculates the operation force by converting the force measured by force measuring part 21 to a force on the control coordinate system associated with the specified control point. Further, in order to improve the operability when moving the robot in response to the force, force calculating part 23 may adjust the magnitude and/or the direction of the calculated operation force in view of the direction and the velocity of movement of the robot during being operated, as needed.

Operation commanding part 24 outputs a command for moving robot 50 in response to the force applied to front end 58 of robot 50, by using the operation force calculated by force calculating part 23 based on the force measured by force measuring part 21. In detail, operation commanding part 24 outputs an operation command for moving (changing) the position and/or orientation of front end 58 of robot 50 on the orthogonal coordinate system at each control period, by translating the tool coordinate system or rotating the tool coordinate system about the control point, and then calculating the direction and the velocity of movement of front end 58 of robot 50 on the orthogonal coordinate system, based on the operation force calculated by force calculating part 23. In this regard, the command of the position and/or orientation of front end 58 of robot 50 on the orthogonal coordinate system is output after being converted to a command of the position of each axis. At this time, the velocity of movement in relation to the operation force may be determined by a force control gain. Further, it is preferable that the velocity of movement be adjusted as needed. For example, responsiveness of the velocity against the operation force may be lowered, or the velocity may be accelerated or decelerated, depending on a status of the movement operation of robot 50.

Storing part 26 stores parameters necessary for various calculations, such as a parameter required by force measuring part 21 for measuring the force, a parameter required by force calculating part 23 for calculating the operation force, and a parameter required by operation commanding part 24 for outputting the operation command, etc., and storing part 26 also stores results of the calculations.

Inputting part 71 receives and processes data which is input to robot controller 10, the data including data which is transferred from an input device connected to robot controller 10 and capable of inputting various settings, and setting data which is input to another controller or a computer and transferred to robot controller 10 via a network, etc. By means of inputting part 71, the control point can be specified or switched, by the input data from outside of robot controller 10.

Although not shown, robot controller 10 may have a means to calculate the position of each axis of robot 50, the position and/or orientation of the front end of robot 50, the velocity and acceleration of robot 50, etc., based on information from a position detector such as an encoder attached to each axis of robot 50.

Figure 3:
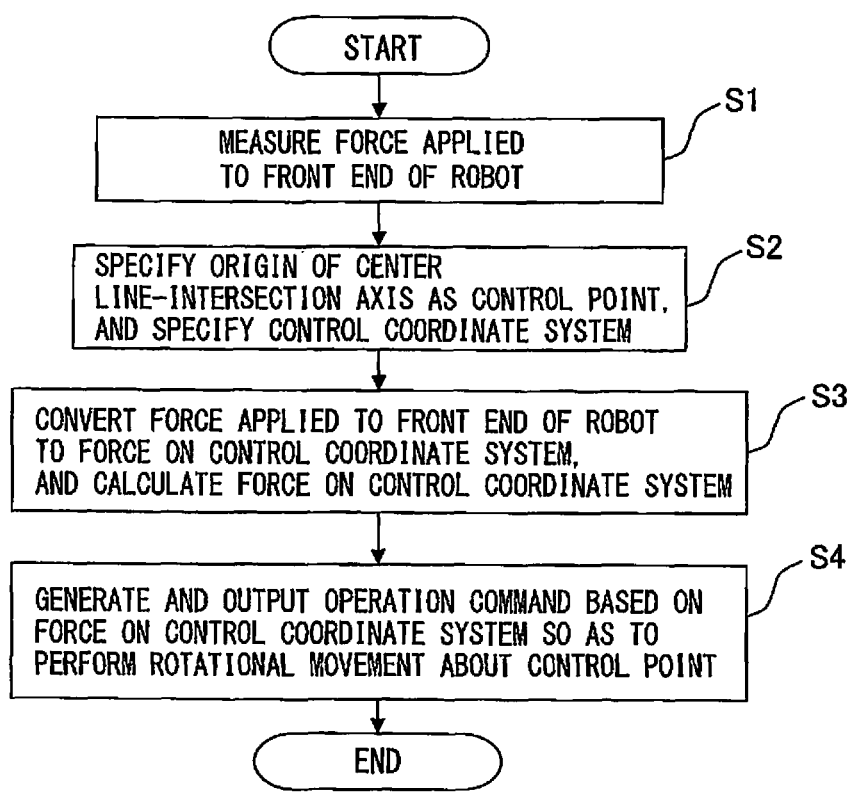
FIG. 3 is a flowchart showing an example of a procedure executed by the robot controller according to the embodiment of the present invention.

Hereinafter, with reference to a flowchart of FIG. 3, an example of a procedure executed by robot controller 10 according to the embodiment of the present invention, wherein robot 50 is rotatably moved about the control point by applying the force to front end 58 of robot 50, will be explained.

When an external force is applied to front end 58 of robot 50 by operator 60, etc., force measuring part 21 measures the force applied to front end 58 (step S1). Then, control point specifying part 22 specifies origin 41 of the centerline-intersecting axis as a control point, and specifies a control coordinate system based on control point 41 (step S2).

Next, force calculating part 23 coverts the force applied to front end 58 of robot 50 to a force on the control coordinate system so as to calculate the force on the control coordinate system, based on the force applied to front end 58 measured by force measuring part 21 and the control coordinate system at control point 41 (step S3). Then, operation commanding part 24 generates and outputs an operation command for rotatably moving the robot about the control point, based on the force on the control coordinate system calculated by force calculating part 23 (step S4). By virtue of the operation command, robot 50 performs the rotational movement about the control point.

FIG. 1 shows that the origin of the centerline-intersecting axis is specified as the control point and the robot is rotatably moved about the control point. In the embodiment, J5 axis 55 is specified as the centerline-intersecting axis, and the rotational movement about origin 41 of J5 axis 55 is performed. The position of origin 41 of J5 axis 55 (to be the centerline-intersecting axis) on the reference coordinate system is determined by the positions of J1 axis 51, J2 axis 52 and J3 axis 53. Therefore, when robot 50 is moved about origin 41 of J5 axis 55, only J4 axis 54, J5 axis 55 and J6 axis 56, among the axes constituting robot 50, are moved, without changing the positions of J1 axis 51, J2 axis 52 and J3 axis 53.

As explained above, by specifying origin 41 of J5 axis 55 as the rotation center, it is sufficient to move the positions of three axes only, among the (six) axes constituting robot 50, when the orientation of front end 58 of robot 50 is moved (changed). Therefore, the number of axes, which should be simultaneously controlled, can be reduced, whereby the rotational movement of robot 50 is stable. Further, since only the three axes are moved, it is easy to move the three axes to respective desired positions, in comparison to a case in which all of the six axes are simultaneously moved.

Since the rotation centerlines of the three rotation axes intersect at origin 41 of J5 axis 55 (to be the centerline-intersecting axis), when the force is applied to front end 58 of robot 50 so that the direction of the force is parallel to the centerline of one of the three axes, the other axes can be moved without moving the one axis, due to the movement operation of the orientation on the orthogonal coordinate system. Therefore, depending on the orientation of front end 58 of robot 50 and/or the direction of the applied force, it is possible to move the desired axis (axes) only.

Thus, only by specifying the control point, without determining an axis not to be moved, the number of axes to be moved among the six axes constituting robot 50 is significantly reduced to three, in the movement operation regarding the orientation of front end 58 of robot 50. Therefore, the orientation of front end 58 of robot 50 can be stably changed, and one or more desired axis among the three axes can be easily moved to (a) desired position(s).

As described above, control point specifying part 22 specifies origin 41 of the centerline-intersecting axis as the control point, force calculating part 23 calculates the force on the control coordinate system having the origin corresponding to the control point, and robot 50 is rotatably moved about the control point based on the calculated force. By virtue of this, the orientation of front end 58 of robot 50 can be stably changed. Further, by the movement operation regarding the orientation on the orthogonal coordinate system, a desired axis can be easily moved to a desired position.

After control point specifying part 22 specifies origin 41 of the centerline-intersecting axis as the control point and force calculating part 23 calculates the force on the control coordinate system having the origin corresponding to the control point, operation commanding part 24 may translate robot 50, as well as rotate robot 50 about the control point, based on the force on the control coordinate system calculated by force calculating part 23. By virtue of this, the position and orientation of front end 58 of robot 50 can be stably moved (changed) in response to the force applied to front 3nd 58 of robot 50, similarly to the above.

Although the robot according to the above embodiment has six axes (i.e., three axes (J4 to J6) intersecting at the control point and the other three axes (J1 to J3) positioned between the pedestal and the axis of the former three axes closest to the pedestal), the present invention may be applied to a robot which does not include the other three axes. Further, the number of axes positioned between the pedestal and the axis of the former three axes closest to the pedestal may be one, two or four or more.

According to the present invention, when each of the plurality of axes constituting the robot is moved to any position, the origin of the centerline-intersecting axis corresponds to the intersecting point of the rotation centerlines of the three rotation axes. Therefore, when the robot is to be moved by applying the force to the front end of the robot and changing the orientation of the front end about the control point, the robot can be stably moved. Further, in the movement operation regarding the orientation of the front end of the robot on the orthogonal coordinate system, the desired axis can be easily moved to the desired position.

When at least one axis is added between the pedestal and the three rotation axes, the position of the control point on the reference coordinate system is determined by the position of the at least one axis. Therefore, when the robot is moved about the control point, the orientation of the front end of the robot can be stably changed without changing the position of the at least one axis.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot controller for moving a position and an orientation of a front end of a robot on an orthogonal coordinate system based on an external force applied to the robot, wherein
the robot has a structure constituted by sequentially combining at least six rotation axes comprising three front end-side rotation axes and three pedestal-side rotation axes,
without depending on positions of the six rotation axes, rotation centerlines of the three front end-side rotation axes intersect at an origin of a centerline-intersecting axis, the centerline-intersecting axis corresponding to one of the three front end-side rotation axes,
the robot includes a pedestal,
the three pedestal-side three rotation axes are positioned between the pedestal and one of the three front end-side rotation axes closest to the pedestal, and
the robot is a vertical multi joint robot in which a spatial position of the origin of the centerline-intersecting axis is determined based on positions of the three pedestal-side rotation axes,
the robot controller comprising:
a force measuring part configured to measure the external force applied to the front end of the robot;
a control point specifying part configured to specify the origin of the centerline-intersecting axis as a control point in relation to the robot;
a force calculating part configured to calculate an operation force by converting the external force measured by the force measuring part to an output force on a control coordinate system having a control coordinate system origin corresponding to the control point, the operation force being determined so that the orientation of the front end of the robot on the orthogonal coordinate system is changed by rotational movement about the control point, or so that the position and orientation of the front end of the robot on the orthogonal coordinate system are changed by rotational movement about the control point and translational movement of the control point; and
an operation commanding part configured to output a command to the robot based on the operation force on the control coordinate system calculated by the force calculating part so that the front end of the robot on the orthogonal coordinate system is rotationally moved about the control point due to movements of the three front end-side rotation axes intersecting at the origin of the centerline-intersecting axis, and so that the front end of the robot on the orthogonal coordinate system is translationally moved by translational movement of the control point due to movements of the three pedestal-side rotation axes.

2. The robot controller as set forth in claim 1, wherein a centerline of one rotation axis among the three pedestal-side rotation axes is orthogonal to centerlines of remaining two rotation axes among the three pedestal-side rotation axes.

3. A robot system comprising the robot and the robot controller as set forth in claim 1.

* * * * *